(12) United States Patent
Takemura et al.

(10) Patent No.: US 12,420,630 B2
(45) Date of Patent: Sep. 23, 2025

(54) VEHICLE FUEL SYSTEM AND VEHICLE FUEL SYSTEM MALFUNCTION DETECTION METHOD

(71) Applicant: SUBARU CORPORATION, Tokyo (JP)

(72) Inventors: Akihiro Takemura, Tokyo (JP); Kazuya Okazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/922,237

(22) PCT Filed: Sep. 21, 2021

(86) PCT No.: PCT/JP2021/034592
§ 371 (c)(1),
(2) Date: Oct. 28, 2022

(87) PCT Pub. No.: WO2023/047465
PCT Pub. Date: Mar. 30, 2023

(65) Prior Publication Data
US 2024/0217333 A1    Jul. 4, 2024

(51) Int. Cl.
*E05B 83/34*    (2014.01)
*B60K 15/04*    (2006.01)
*E05B 81/70*    (2014.01)

(52) U.S. Cl.
CPC .......... *B60K 15/0409* (2013.01); *E05B 81/70* (2013.01); *E05B 83/34* (2013.01)

(58) Field of Classification Search
CPC ................ B60K 15/0409; B60K 15/05; B60K 2015/0507; B60K 2015/0515;
(Continued)

(56) References Cited

U.S. PATENT DOCUMENTS 9,327,594 B2 *    5/2016    Georgi .................... E05B 77/54
9,969,265 B2 *    5/2018    Williams ................ E05B 81/70
(Continued)

FOREIGN PATENT DOCUMENTS

DE    19956350 A1    6/2001
DE    102014222269 A1 *  5/2016 ............. B60K 15/04
(Continued)

OTHER PUBLICATIONS

Japanese Office Action, dated May 28, 2024 in Japanese Application No. 2023-549199 and English Translation thereof.

*Primary Examiner* — Kristina R Fulton
*Assistant Examiner* — Noah Horowitz
(74) *Attorney, Agent, or Firm* — MCGINN I.P. LAW GROUP, PLLC

(57) ABSTRACT

A vehicle fuel system according to the invention includes a fuel filler flap that blocks an opening of a fuel filler space to be openable and closable, a locking mechanism that regulates opening and closing operation of the fuel filler flap, and a detector that detects the opening and closing operation of the fuel filler flap. A controller is able to determine an operational state of the fuel filler flap multiple times within one driving cycle of a vehicle, which improves a frequency of diagnosing the operational state of the fuel filler flap and a stuck-closed state of the detector.

9 Claims, 4 Drawing Sheets

(58) Field of Classification Search
CPC ...... B60K 2015/053; B60K 2015/0546; B60K 2015/0561; B60K 2015/0576; B60K 2015/0584; E05B 83/34; E05B 81/70
See application file for complete search history.

(56) References Cited

U.S. PATENT DOCUMENTS

| | | | |
|---|---|---|---|
| 9,969,354 B2 * | 5/2018 | Kojima | B60R 25/01 |
| 11,008,780 B2 * | 5/2021 | Oxley | E05C 17/203 |
| 11,872,877 B2 * | 1/2024 | Tani | E05B 47/0046 |
| 2017/0246965 A1 | 8/2017 | Nakagawa et al. | |
| 2023/0058252 A1 * | 2/2023 | Watanabe | E05B 81/70 |

FOREIGN PATENT DOCUMENTS

| | | |
|---|---|---|
| DE | 102018201788 A1 * | 8/2019 |
| JP | 2008-168748 A | 7/2008 |
| JP | 2013-237393 A | 11/2013 |
| JP | 2015-123884 A | 7/2015 |
| JP | 2015-123885 A | 7/2015 |
| JP | 2016-103962 A | 6/2016 |
| JP | 2017-149362 A | 8/2017 |
| WO | WO-2024128919 A1 * | 6/2024 |

* cited by examiner

[ FIG. 1 ]
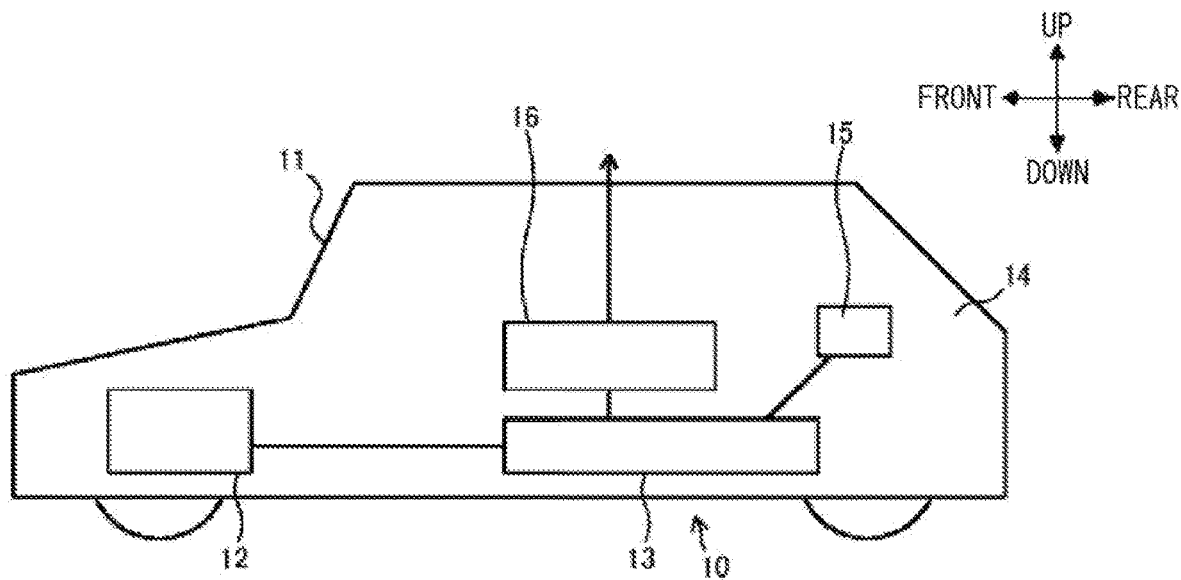
[ FIG. 2 ]
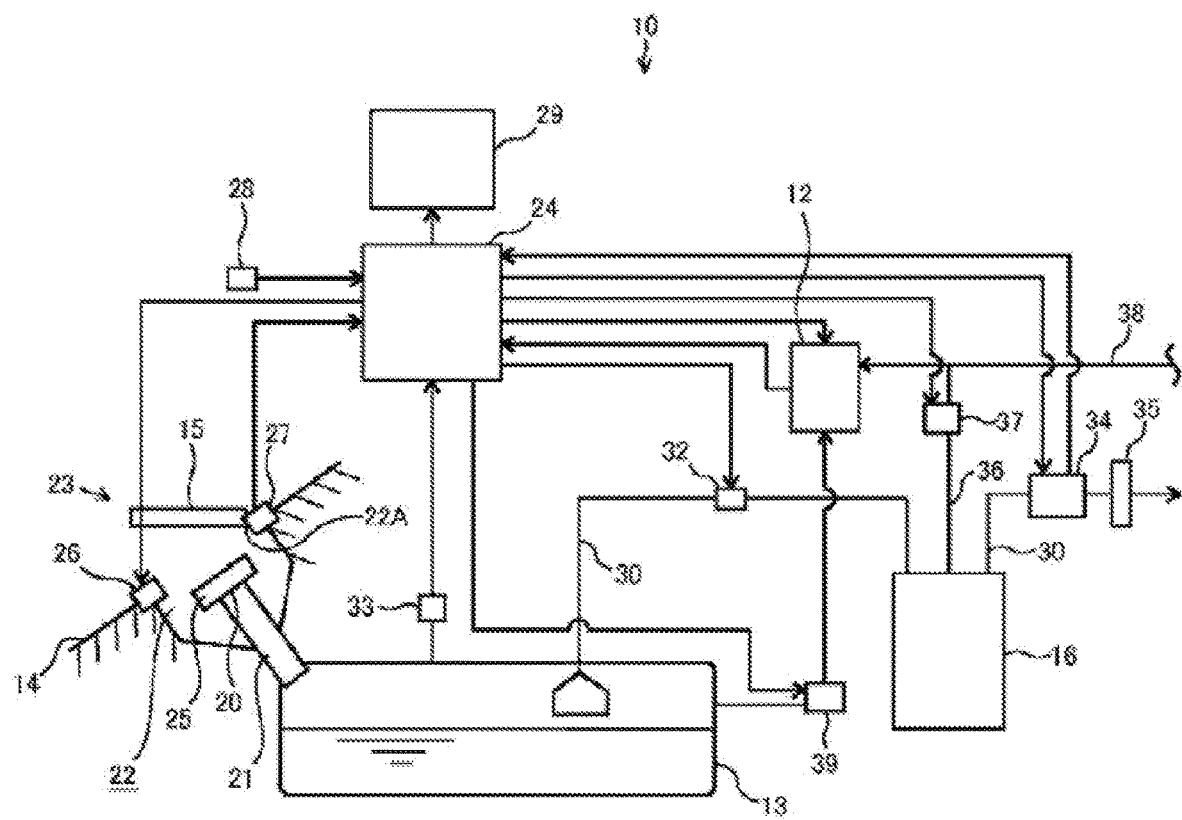

[FIG. 3]
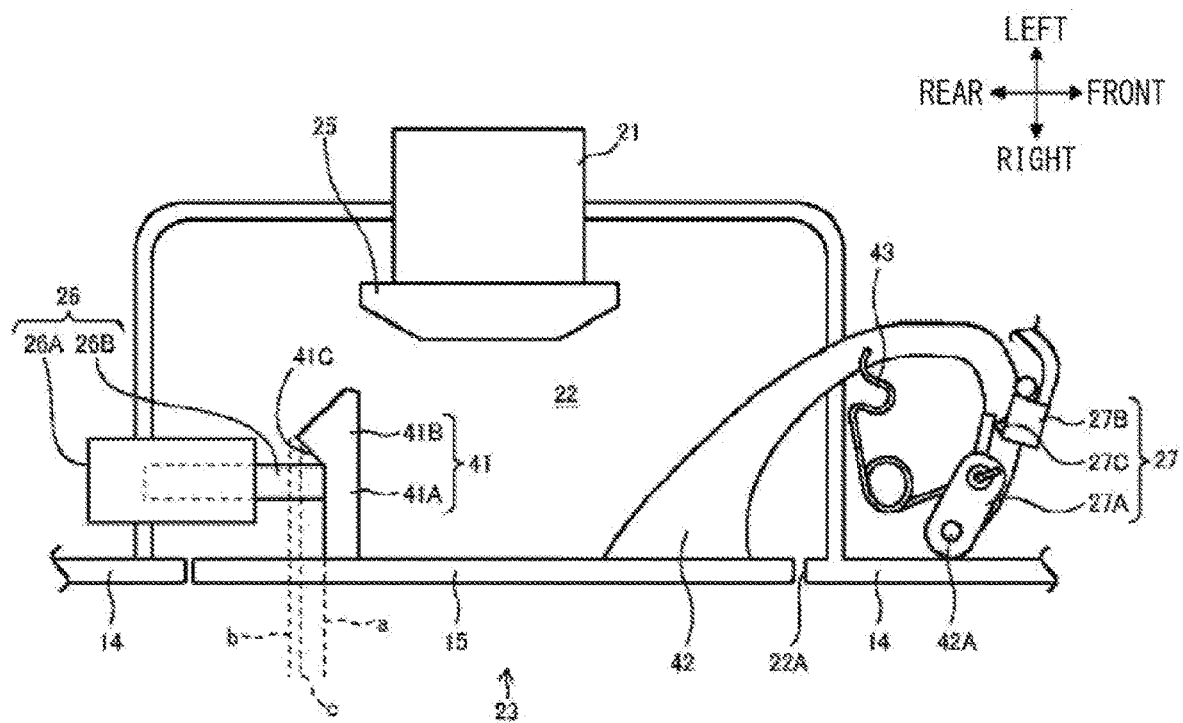

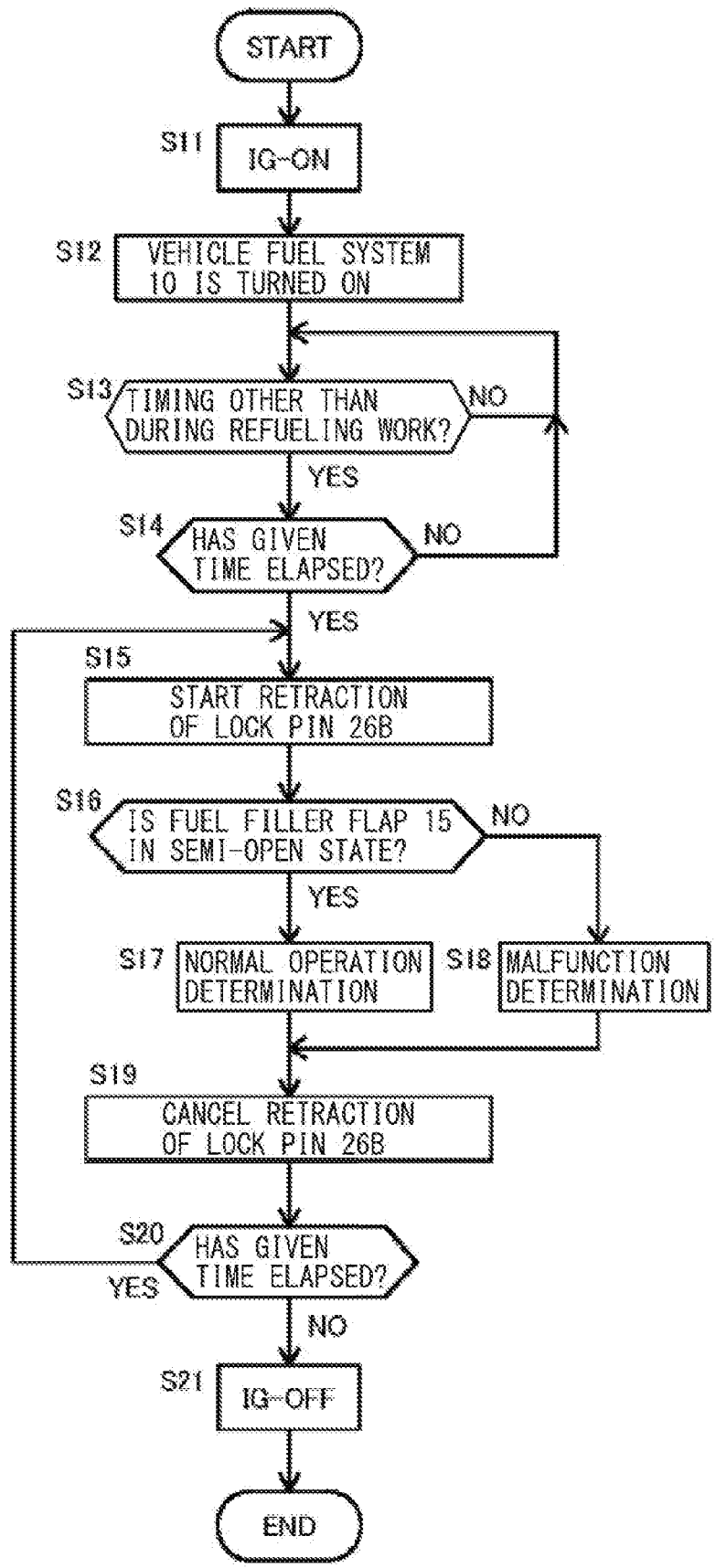
[FIG. 4]

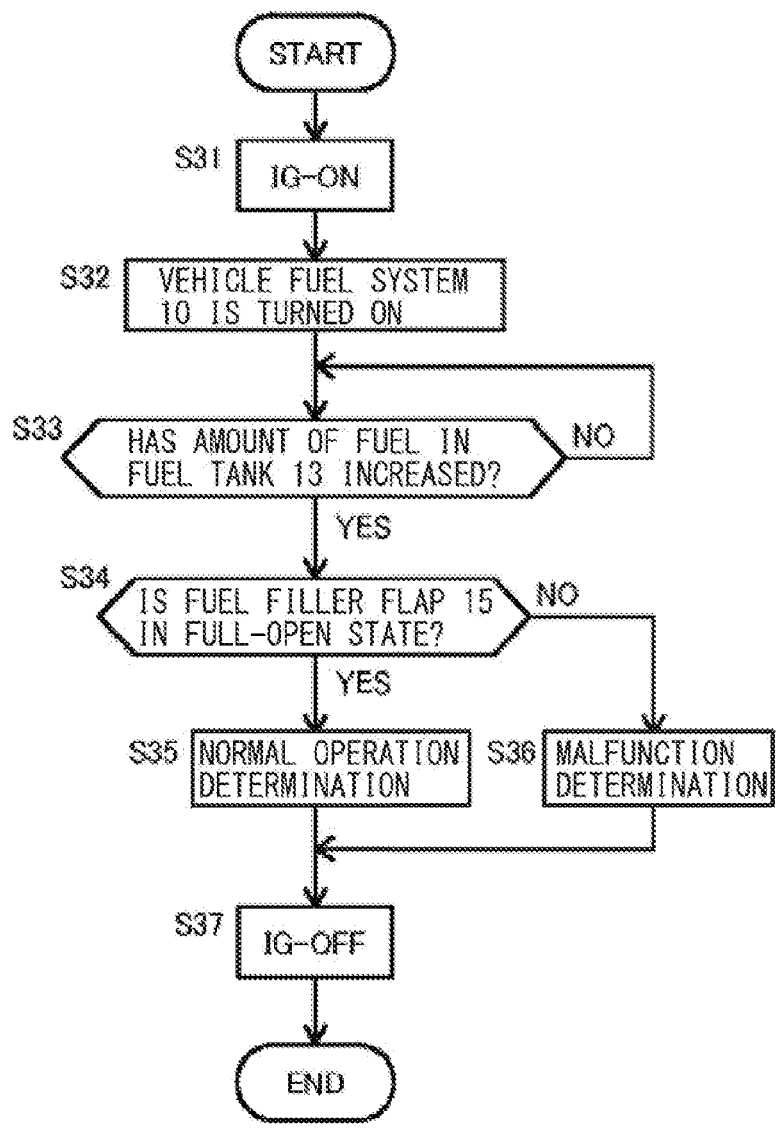

VEHICLE FUEL SYSTEM AND VEHICLE FUEL SYSTEM MALFUNCTION DETECTION METHOD

CROSS-REFERENCE TO RELATED APPLICATIONS

This application is the U.S. National Phase under 35 U.S.C. § 371 of International Application No. PCT/JP2021/034592, filed on Sep. 21, 2021.

TECHNICAL FIELD

The invention relates to a vehicle fuel system and a vehicle fuel system malfunction detection method that are able to detect a malfunction of a fuel filler flap and a stuck-closed state of a detector within one driving cycle including while a vehicle is traveling.

BACKGROUND ART

Patent Literature 1 discloses an existing fuel filler lid device malfunction detection method. A fuel filler lid device is used for a fuel system of a vehicle. The fuel filler lid device mainly includes a fuel filler lid that blocks a space in which a fuel filler port is provided, a lid locking mechanism that locks the fuel filler lid in a closed state, a fuel filler lid switch that performs an operation of opening the fuel filler lid, and a fuel filler lid opening and closing sensor that detects opening and closing of the fuel filler lid.

The fuel filler lid switch and the fuel filler lid opening and closing sensor are coupled to an electronic control unit (hereinafter referred to as an "ECU") of the vehicle. Further, if the fuel filler lid switch is operated by an occupant of the vehicle, for example, the ECU puts a door motor of the lid locking mechanism into operation to unlock the fuel filler lid.

At this occasion, in a case where an output of the closed state is detected from the fuel filler lid opening and closing sensor, even upon on-operation of the door motor, the ECU determines that the fuel filler lid device is malfunctioning due to a malfunction, for example, of the door motor of the lid locking mechanism.

CITATION LIST

Patent Literature

Patent Literature 1: Japanese Unexamined Patent Application Publication No. 2015-123885

SUMMARY OF INVENTION

Problem to be Solved by the Invention

As described above, malfunction determination of a fuel filler lid device is typically performed when a fuel filler lid switch is actually operated by an occupant of a vehicle, for example, such as at a timing of supplying fuel to a fuel tank of the vehicle. This brings about a problem in that a diagnosis frequency of the fuel filler lid device is low, and it is difficult to find a malfunction of a fuel filler lid at an early stage.

In addition, in an existing lid locking mechanism, a door motor causes a tip of a door hook to move between a position A and a position B illustrated in Patent Literature 1, to form a locked state or an unlocked state of a door bracket. Therefore, the fuel filler lid in an open state does not close unless the fuel filler lid is pushed from the outside of the vehicle. This brings about a problem in that it is difficult to perform malfunction detection of the fuel filler lid device while the vehicle is traveling.

In view of the above-described circumstances, it is an object of the invention to provide a vehicle fuel system and a vehicle fuel system malfunction detection method that are able to detect a malfunction of a fuel filler flap and a stuck-closed state of a detector within one driving cycle including while a vehicle is traveling.

Means for Solving the Problem

A vehicle fuel system according to an embodiment of the invention includes: a fuel filler port through which fuel is to be supplied to a fuel tank of a vehicle; a fuel filler space of a vehicle body of the vehicle in which the fuel filler port is disposed: a fuel filler flap configured to block an opening of the fuel filler space to be openable and closable; a locking mechanism configured to regulate opening and closing operation of the fuel filler flap with respect to the opening: and a detector configured to detect an open or closed state of the fuel filler flap. The locking mechanism includes a lock that is provided on the vehicle body and configured to operate in the fuel filler space, and a lock receiver that is provided on the fuel filler flap on the fuel filler space side and is configured to be locked by the lock. The detector detects at least a first detection value indicating that the lock receiver is locked by the lock and the fuel filler flap is in a full-closed state with respect to the opening, and a second detection value indicating that the lock receiver is locked by the lock and the fuel filler flap is in a semi-open state with respect to the opening.

In addition, a vehicle fuel system malfunction detection method according to an embodiment of the invention is for a vehicle fuel system including a controller configured to determine at least an operational state of a fuel filler flap or a stuck-closed state of a detector. The detector is configured to detect opening and closing operation of the fuel filler flap. The vehicle fuel system malfunction detection method includes determining, by the controller, at least the operational state of the fuel filler flap or the stuck-closed state of the detector, based on an operation detection result of a lock inputted from a locking mechanism and an opening and closing detection result of the fuel filler flap inputted from the detector. The locking mechanism includes the lock configured to regulate the opening and closing operation of the fuel filler flap.

Effects of the Invention

In the vehicle fuel system according to the embodiment of the invention, the fuel filler flap is in the semi-open state with respect to the opening in a state in which the lock receiver is locked by the lock. Further, the detector detects the semi-open state of the fuel filler flap. This structure enables the controller of the vehicle fuel system to determine the operational state of the fuel filler flap multiple times within one driving cycle of the vehicle. This improves a diagnosis frequency at which the operational state of the fuel filler flap and the stuck-closed state of the detector are detected and diagnosed.

In addition, the vehicle fuel system malfunction detection method according to the embodiment of the invention puts the lock of the locking mechanism into operation while the vehicle is traveling, and detects the open or closed state of the fuel filler flap. Further, the controller determines the operational state of the fuel filler flap by using the operation detection result of the lock and the opening and closing detection result of the fuel filler flap. This malfunction detection method enables the controller of the vehicle fuel system to determine the operational state of the fuel filler flap at a timing other than during refueling work within one driving cycle of the vehicle. This makes it possible to find a malfunction of the fuel filler flap and the stuck-closed state of the detector at an early stage.

BRIEF DESCRIPTION OF DRAWINGS

FIG. 1 is a schematic diagram illustrating a vehicle mounted with a vehicle fuel system according to an embodiment of the invention.

FIG. 2 is a schematic diagram illustrating the vehicle fuel system according to the embodiment of the invention.

FIG. 3 is a cross-sectional diagram illustrating a fuel filler lid device of the vehicle fuel system according to the embodiment of the invention.

FIG. 4 is a flowchart illustrating a vehicle fuel system malfunction detection method according to another embodiment of the invention.

FIG. 5 is a flowchart illustrating the vehicle fuel system malfunction detection method according to the other embodiment of the invention.

MODES FOR CARRYING OUT THE INVENTION

First, a vehicle fuel system 10 according to an embodiment of the invention is described in detail with reference to the drawings. Note that, in describing the present embodiment, the same members are basically denoted with the same reference numerals to avoid any redundant description. In addition, in the following description, an up-down direction indicates a height direction of a vehicle 11, a right-left direction indicates a vehicle width direction of the vehicle 11, and a front-rear direction indicates an overall length direction of the vehicle 11.

FIG. 1 is a schematic diagram illustrating the vehicle 11 mounted with the vehicle fuel system 10 according to the present embodiment. FIG. 2 is a schematic diagram illustrating the vehicle fuel system 10 according to the present embodiment. FIG. 3 is a cross-sectional diagram illustrating a fuel filler lid device 23 of the vehicle fuel system 10 according to the present embodiment.

As illustrated in FIG. 1, the vehicle 11 is mounted with an engine 12 and the vehicle fuel system 10 that supplies fuel to the engine 12. Further, in the vehicle 11, the fuel is supplied from a fuel tank 13 to the engine 12. The engine 12 combusts the fuel to generate driving force, which enables the vehicle 11 to travel.

In addition, a fuel filler flap 15 is assembled to a vehicle body 14 of the vehicle 11. The fuel filler flap 15 blocks an opening 22A (see FIG. 2) of a fuel filler space 22 (see FIG. 2) to be openable and closable. A fuel filler port 20 (see FIG. 2) is disposed in the fuel filler space 22. Further, in the vehicle 11, the fuel filler flap 15 being opened with respect to the opening 22A makes it possible to supply the fuel to the fuel tank 13.

Note that fuel gas produced from the fuel in the fuel tank 13 is exhausted to the outside of the vehicle through a canister 16. This suppresses issuing, in refueling work for the vehicle 11, of the fuel gas put into a high-pressure state in the fuel tank 13 from the fuel filler port 20.

As illustrated in FIG. 2, the vehicle fuel system 10 mainly includes the fuel tank 13, the fuel filler port 20 for supply of the fuel to the fuel tank 13, the fuel filler lid device 23 provided for the fuel filler space 22 in which the fuel filler port 20 is disposed, the canister 16, and a controller 24 that controls the vehicle fuel system 10. Further, the vehicle fuel system 10 minimizes release of the fuel gas to the outside of the vehicle and controls the fuel filler lid device 23, while supplying the fuel to the engine 12.

The fuel tank 13 is provided in the vehicle body 14 (see FIG. 1) of the vehicle 11. A filler tube 21 is provided to communicate with the fuel tank 13, and a filler cap 25 is provided at a tip of the filler tube 21. Further, an opening at the tip of the filler tube 21 is the fuel filler port 20, and the fuel filler port 20 is provided in the fuel filler space 22 of the vehicle body 14. In addition, the filler cap 25 is mounted at the tip of the filler tube 21 to block the fuel filler port 20 to be openable and closable.

The fuel filler lid device 23 mainly includes the fuel filler flap 15 that blocks the opening 22A of the fuel filler space 22 to be openable and closable, a locking mechanism 26 that regulates opening and closing operation of the fuel filler flap 15, a detector 27 that detects an open or closed state of the fuel filler flap 15, and a refueling switch 28 that performs an operation of opening the fuel filler flap 15.

The fuel filler flap 15 is, in a state of blocking the opening 22A of the fuel filler space 22, disposed to be substantially continuous with an exterior surface of the vehicle body 14 to form a design surface of the vehicle body 14.

The controller 24 includes, for example, a central processing unit (CPU), a read only memory (ROM), and a random access memory (RAM). Further, the controller 24 is an electronic control unit (ECU) including one or more processors that execute various calculations, for example, for control of the vehicle fuel system 10, the engine 12, etc.

In addition, the controller 24 includes a storage (unillustrated). The storage includes, for example, a non-volatile memory such as an electrically erasable programmable read-only memory (EEPROM). The storage holds various pieces of data necessary for control of the vehicle 11 and one or more programs executable by the one or more processors.

The locking mechanism 26 is provided near an open end of the opening 22A and coupled to the controller 24. Used as the locking mechanism 26 is, for example, a solenoid device that controls the opening and closing operation of the fuel filler flap 15. The solenoid device includes a solenoid 26A, and a lock pin 26B that is driven by the solenoid 26A. Further, the locking mechanism 26 keeps the fuel filler flap 15 in the following three open or closed states, depending on an amount of retraction of the lock pin 26B. Note that the locking mechanism 26 inputs, to the controller 24, a signal indicating information on the amount of retraction of the lock pin 26B, serving as an operation detection result of the lock pin 26B. In addition, the lock pin 26B according to the present embodiment serves as an example of a lock according to the invention of the application.

Although details will be described later, the fuel filler flap 15 has at least three open or closed states of: a full-closed state of being locked by the lock pin 26B and completely blocking the opening 22A: a semi-open state of being locked by the lock pin 26B and partly open with respect to the opening 22A: and a full-open state of being fully open with respect to the opening 22A without being locked by the lock pin 26B. Note that the semi-open state of the fuel filler flap 15 in the present embodiment is a state in which the fuel filler flap 15 is open with respect to the opening 22A, but not open enough with respect to the opening 22A for the refueling work for the vehicle 11 to be performed.

The detector 27 is provided near the open end of the opening 22A and coupled to the controller 24. Used as the detector 27 is, for example, a button-type switch device that detects the opening and closing operation of the fuel filler flap 15. Further, the detector 27 inputs, to the controller 24, a signal indicating opening/closing information of the fuel filler flap 15, serving as an opening and closing detection result of the fuel filler flap 15. Note that a detection value of the full-closed state of the fuel filler flap 15 detected by the detector 27 corresponds to a first detection value according to the invention of the application, and a detection value of the semi-open state of the fuel filler flap 15 detected by the detector 27 corresponds to a second detection value according to the invention of the application.

The refueling switch 28 is provided on any of a side of a driver's seat, a steering wheel, an instrument panel, etc., for example, and coupled to the controller 24. Further, an occupant of the vehicle 11 operates the refueling switch 28 in performing the refueling work, which causes the fuel filler flap 15 to shift from the full-closed state to the full-open state via the locking mechanism 26.

A multifunction display 29 is provided on the instrument panel, for example, and coupled to the controller 24. Although details will be described later, in a case where the controller 24 determines that the fuel filler lid device 23 is in a malfunction state, the multifunction display 29 warns the occupant of the vehicle 11 of the malfunction state. Note that the occupant of the vehicle 11 may be warned of the malfunction state by, without being limited to the multifunction display 29, an indicator in the instrument panel or another warning lamp. Alternatively, warning sound or voice may be produced.

To the fuel tank 13, a fuel gas exhaust path 30 is coupled to exhaust gas in the fuel tank 13 to the outside of the vehicle 11. Further, in the fuel gas exhaust path 30, the canister 16 that temporarily adsorbs the fuel gas is provided to suppress air pollution due to leakage of the fuel gas vaporized in the fuel tank 13 to the outside.

A relief valve 32 is provided between the fuel tank 13 and the canister 16 in the fuel gas exhaust path 30. The relief valve 32 is in a closed state until an internal pressure of the fuel tank 13 reaches a predetermined reference value. The fuel tank 13 is thus sealed and release of the fuel gas from the fuel tank 13 is suppressed. In contrast, the relief valve 32 opens if the internal pressure of the fuel tank 13 exceeds the predetermined reference value, to allow for communication between the inside and the outside of the fuel tank 13, and the fuel gas, for example, in the fuel tank 13 is released into the air via the canister 16. Further, the pressure in the fuel tank 13 decreases.

Note that the pressure in the fuel tank 13 is detected by a pressure sensor 33, and the controller 24 controls the relief valve 32 by using a detection value of the pressure sensor 33. In addition, the relief valve 32 may be mechanical, or may be electronic in a case where no spark is produced.

A leakage diagnostic device 34 and a filter 35 are provided in the fuel gas exhaust path 30. The leakage diagnostic device 34 includes switching valves, a pressure reduction pump, and a pressure sensor, for example, which are unillustrated. The leakage diagnostic device 34 introduces and exhausts air to and from a fuel system such as the fuel tank 13 or the fuel gas exhaust path 30, and diagnoses leakage from the fuel system. The filter 35 traps dust, for example, when outside air is introduced from the fuel gas exhaust path 30.

In addition, the fuel gas exhaust path 30 is coupled to the engine 12 via a purge path 36. The purge path 36 couples the canister 16 and an intake path 38 of the engine 12, and a purge valve 37 is provided in the purge path 36. Further, the fuel gas adsorbed onto an adsorbent of the canister 16 is partly supplied to the engine 12 via the purge path 36 and the intake path 38, for example.

An injector 39 is coupled to the fuel tank 13, and jets the fuel in the fuel tank 13 to the engine 12.

As illustrated in FIG. 3, the fuel filler flap 15 is assembled to the vehicle body 14 to block the opening 22A of the fuel filler space 22 to be openable and closable. Further, the fuel filler flap 15 is, in the state of blocking the opening 22A of the fuel filler space 22, disposed to be substantially continuous with the exterior surface of the vehicle body 14 to form the design surface of the vehicle body 14.

Formed on an inside surface of the fuel filler flap 15 are a lock receiver 41 and a rotating arm 42 coupled to the fuel filler flap 15 and extending to the fuel filler space 22 side. Further, the lock receiver 41 and the rotating arm 42 move together with the fuel filler flap 15.

The lock receiver 41 is provided on a tip side of the fuel filler flap 15, and is engaged with the lock pin 26B of the locking mechanism 26. Further, the lock receiver 41 includes a shaft 41A coupled to the fuel filler flap 15, and an opening degree adjuster 41B formed on a tip side of the shaft 41A. As illustrated, the opening degree adjuster 41B has a substantially triangular shape in cross-sectional view protruding toward the rear side of the vehicle body 14. Further, by the lock receiver 41 being locked by the lock pin 26B on an inclined surface 41C of the opening degree adjuster 41B, an opening degree of the fuel filler flap 15 is adjusted depending on a position of a tip of the lock pin 26B.

Here, the solenoid device, for example, is used as the locking mechanism 26. Further, the solenoid 26A of the locking mechanism 26 is fixed to the vehicle body 14 on a rear end side of the opening 22A. In contrast, the lock pin 26B of the locking mechanism 26 is driven by the solenoid 26A to move in the front-rear direction of the vehicle 11 toward the lock receiver 41.

In the present embodiment, the tip of the lock pin 26B moves between lines indicated by dotted lines "a" and "b". A position of the dotted line "a" is a position where the lock receiver 41 is engaged with the lock pin 26B to put the fuel filler flap 15 into the full-closed state of completely blocking the opening 22A. In contrast, a position of the dotted line "b" is a position where the lock receiver 41 is not engaged with the lock pin 26B to put the fuel filler flap 15 into the full-open state with respect to the opening 22A. In addition, a position of a dotted line "c" is a position where the lock receiver 41 keeps a state of being engaged with the lock pin 26B.

With the structure described above, while the tip of the lock pin 26B moves between the lines indicated by the dotted lines "a" and "c", the inclined surface 41C of the lock receiver 41 and the tip of the lock pin 26B are in contact with each other. Further, the lock receiver 41 is engaged with the lock pin 26B, but the fuel filler flap 15 is in the semi-open state of being partly open with respect to the opening 22A. Note that the locking mechanism 26 inputs, to the controller 24, a signal indicating information on the amount of retraction of the lock pin 26B from the position of the dotted line "a".

The rotating arm 42 is provided on a front end side of the fuel filler flap 15. A root side of the rotating arm 42 is supported to be rotatable, via a rotating shaft 42A, by the vehicle body 14 outside the fuel filler space 22. In addition, the rotating arm 42 is provided with a spring 43 biased in an opening direction. Thus, the fuel filler flap 15 is biased in the opening direction with respect to the opening 22A via the spring 43.

With this structure, the open or closed state of the fuel filler flap 15 shifts from the full-closed state to the semi-open state, lastly to the full-open state, in conjunction with retraction operation of the lock pin 26B to the position of the dotted line "b" from the dotted line "a" through the dotted line "c". Note that, after the refueling work, the occupant of the vehicle 11, for example, manually pushes the fuel filler flap 15 to the vehicle body 14 side, and the lock pin 26B returns to the position of the dotted line "a", which causes a shift from the full-open state to the full-closed state.

As the detector 27, for example, the button-type switch device that detects the opening and closing operation of the fuel filler flap 15 is used. A depressing plate 27A fixed on the rotating arm 42 side rotates integrally with the rotating arm 42, which changes an amount of depression of a button 27C of a switch device 27B. The detector 27 detects the amount of depression of the button 27C to detect the open or closed state of the fuel filler flap 15. Further, the detector 27 inputs, to the controller 24, a signal indicating the detected opening/closing information of the fuel filler flap 15.

Next, a malfunction detection method for the vehicle fuel system 10 according to another embodiment of the invention is described in detail with reference to the drawings. Note that, in describing the present embodiment, the same members as those of the vehicle fuel system 10 described with reference to FIGS. 1 to 3 are basically denoted with the same reference numerals to avoid any redundant description.

FIG. 4 is a flowchart illustrating a control method at a timing other than during the refueling work for the vehicle 11, in the malfunction detection method for the vehicle fuel system 10 according to the present embodiment. Note that one driving cycle in the present embodiment refers to a period after the vehicle 11 is put into an ignition-on state in step S11 below until the vehicle is put into an ignition-off state for the first time in step S21 below.

As illustrated in FIG. 4, in step S11, if the occupant, such as a driver, gets on the vehicle 11 and depresses an ignition switch (unillustrated), the vehicle 11 enters the ignition-on state. In step S12, in response to the depression of the ignition switch, the vehicle fuel system 10 of the vehicle 11 also enters an on state.

In step S13, the controller 24 of the vehicle fuel system 10 determines whether the refueling work is currently being performed on the vehicle 11. In a case where the controller 24 detects an increase in an amount of fuel of the fuel tank 13, the controller 24 determines that the refueling work is currently being performed on the vehicle 11.

If the controller 24 determines that the refueling work is currently not being performed on the vehicle 11 (step S13: YES), the controller 24 moves on to step S14. Further, in step S14, the controller 24 determines whether given time has elapsed after the entry of the vehicle fuel system 10 to the on state.

If the controller 24 determines that the given time has elapsed (step S14: YES), the controller 24 moves on to step S15. In step S15, the controller 24 controls the locking mechanism 26 to pass current through the solenoid 26A and retract the lock pin 26B by a predetermined amount.

Here, as illustrated in FIG. 3, in a case where the tip of the lock pin 26B is positioned at the line of the dotted line "a", the lock receiver 41 is locked by the lock pin 26B at the root of the inclined surface 41C, and the fuel filler flap 15 is in the full-closed state. In contrast, in a case where the tip of the lock pin 26B is positioned between the lines of the dotted lines "a" and "c", the lock receiver 41 is locked by the lock pin 26B midway on the inclined surface 41C, and the fuel filler flap 15 is in the semi-open state.

With this structure, in step S15, the controller 24 causes the lock pin 26B to retract into a housing of the solenoid 26A, until the tip of the lock pin 26B is brought from the position of the dotted line "a" to an intermediate part between the lines of the dotted lines "a" and "c".

In step S16, the controller 24 determines whether the fuel filler flap 15 is in the semi-open state, in conjunction with the retraction operation of the lock pin 26B, on the basis of a detection signal from the detector 27. Further, if a detection signal indicating that the fuel filler flap 15 has opened is inputted from the detector 27 (step S16: YES), the controller 24 determines that the fuel filler flap 15 is in the semi-open state, and moves on to step S17.

In step S17, the controller 24 determines that the fuel filler flap 15 and the detector 27 of the fuel filler lid device 23 are in normal operation on the basis of that the fuel filler flap 15 enters the semi-open state in conjunction with the retraction operation of the lock pin 26B, and moves on to step S19.

In contrast, if a detection signal indicating that the fuel filler flap 15 has not opened is inputted from the detector 27 (step S16: NO), the controller 24 determines that the fuel filler flap 15 is in the full-closed state, or that the detector 27 is in a so-called stuck-closed state in which the fuel filler flap 15 is in normal operation but the detector 27 erroneously detects that the fuel filler flap 15 is in the full-closed state, and moves on to step S18.

In step S18, the controller 24 determines that the fuel filler flap 15 of the fuel filler lid device 23 is malfunctioning, or that the detector 27 is in the stuck-closed state, on the basis of that the fuel filler flap 15 keeps the full-closed state in conjunction with the retraction operation of the lock pin 26B, and moves on to step S19. Note that the controller 24 may control the multifunction display 29 to warn the occupant of the vehicle 11 of the malfunction state.

In step S19, the controller 24 controls the locking mechanism 26 to pass current through the solenoid 26A, cancel a retracted state of the lock pin 26B, and lead out the lock pin 26B from the housing of the solenoid 26A again until the tip of the lock pin 26B returns to the position of the dotted line "a". Note that, in conjunction with this operation of the lock pin 26B, the fuel filler flap 15 enters the full-closed state again.

In step S20, the controller 24 determines whether given time has elapsed after retraction cancellation work for the lock pin 26B. Further, if the controller 24 determines that the given time has elapsed (step S20: YES), the controller 24 moves on to step S15, and determines an operational state of the fuel filler flap 15 of the fuel filler lid device 23 by the control method in step S15 and subsequent steps described above.

In contrast, if the controller 24 determines that the given time has not elapsed (step S20: NO), the controller 24 moves on to step S21. Further, in step S21, if the occupant of the vehicle 11 parks the vehicle 11 in a parking lot, for example, and depresses the ignition switch, the vehicle 11 enters the ignition-off state. Thereafter, the vehicle fuel system 10 of the vehicle 11 also enters an off state, and the determination of the operational state of the fuel filler flap 15 of the fuel filler lid device 23 also ends.

As described above, at a timing when the refueling work for the vehicle 11 is not being performed, such as while the vehicle 11 is traveling, the vehicle fuel system 10 puts the lock pin 26B into operation, and detects the opening and closing operation of the fuel filler flap 15. The vehicle fuel system 10 is thus able to determine the operational state of the fuel filler flap 15 of the fuel filler lid device 23 and the stuck-closed state of the detector 27. Moreover, the vehicle fuel system 10 is also able to determine, within one driving cycle of the vehicle 11, the operational state of the fuel filler flap 15 of the fuel filler lid device 23 and the stuck-closed state of the detector 27 multiple times.

The malfunction detection method for the vehicle fuel system 10 improves a frequency of diagnosing the operational state of the fuel filler flap 15 of the fuel filler lid device 23 and the stuck-closed state of the detector 27, making it possible to find the operational state of the fuel filler flap 15 of the fuel filler lid device 23 and the stuck-closed state of the detector 27 at an early stage.

In addition, in the vehicle fuel system 10, the open state of the fuel filler flap 15 includes at least two states of: the semi-open state in which the lock receiver 41 keeps a state of being locked by the lock pin 26B: and the full-open state in which the lock receiver 41 is in a state of not being locked by the lock pin 26B. Further, when the operational state of the fuel filler flap 15 of the fuel filler lid device 23 is determined, the fuel filler flap 15 enters the semi-open state, which prevents the fuel filler flap 15 from entering the full-open state while the vehicle is traveling, enabling the vehicle 11 to travel safely.

Note that, in the malfunction detection method for the vehicle fuel system 10 according to the present embodiment, described is a case of determining the operational state of the fuel filler flap 15 of the fuel filler lid device 23 and the stuck-closed state of the detector 27 at a timing when the refueling work for the vehicle 11 is not being performed. However, the malfunction detection method is not limited to this case. For example, the vehicle fuel system 10 according to the present embodiment is able to determine the operational state of the fuel filler flap 15 of the fuel filler lid device 23 and the stuck-closed state of the detector 27 even during the refueling work for the vehicle 11. Further, FIG. 5 is a flowchart illustrating a control method during the refueling work for the vehicle 11, in the malfunction detection method for the vehicle fuel system 10 according to the present embodiment.

As illustrated in FIG. 5, in step S31, if the occupant, such as the driver, gets on the vehicle 11 and depresses the ignition switch (unillustrated), the vehicle 11 enters the ignition-on state. In step S32, in response to the depression of the ignition switch, the vehicle fuel system 10 of the vehicle 11 also enters the on state.

In step S33, the controller 24 determines whether the amount of fuel in the fuel tank 13 has increased. Further, if the controller 24 determines that the amount of fuel in the fuel tank 13 has increased (step S33: YES), the controller 24 moves on to step S34. In contrast, if the controller 24 determines that the amount of fuel in the fuel tank 13 has not increased (step S33: NO), the controller 24 continues monitoring the amount of fuel in the fuel tank 13.

In step S34, the controller 24 determines whether the fuel filler flap 15 is in the full-open state, on the basis of a detection signal from the detector 27. Further, if the controller 24 determines that the fuel filler flap 15 is in the full-open state (step S34: YES), the controller 24 moves on to step S35.

In step S35, the controller 24 determines that the fuel filler flap 15 has opened normally and refueling has been performed, on the basis of that the amount of fuel increases and the fuel filler flap 15 enters the full-open state. The controller 24 thus determines that the fuel filler flap 15 and the detector 27 of the fuel filler lid device 23 are in normal operation, and moves on to step S37.

In contrast, if the controller 24 determines that the fuel filler flap 15 is not in the full open state (step S34: NO), the controller 24 moves on to step S36.

In step S36, the controller 24 determines that, although the amount of fuel has increased, the fuel filler flap 15 has not entered the full-open state and the fuel filler flap 15 of the fuel filler lid device 23 is malfunctioning, or that the detector 27 is in the stuck-closed state, and moves on to step S37. Note that the controller 24 may control the multifunction display 29 to warn the occupant of the vehicle 11 of the malfunction state.

In step S37, if the occupant of the vehicle 11 parks the vehicle 11 in a parking lot, for example, and depresses the ignition switch, the vehicle 11 enters the ignition-off state. Thereafter, the vehicle fuel system 10 of the vehicle 11 also enters the off state, and the determination of the operational state of the fuel filler flap 15 of the fuel filler lid device 23 also ends.

Note that, in addition, various modifications may be made without departing from the scope of the invention.

DESCRIPTION OF REFERENCE NUMERALS

10 Vehicle fuel system
11 Vehicle
12 Engine
13 Fuel tank
14 Vehicle body
15 Fuel filler flap
16 Canister
20 Fuel filler port
21 Filler tube
22 Fuel filler space
22A Opening
23 Fuel filler lid device
24 Controller
25 Filler cap
26 Locking mechanism
26A Solenoid
26B Lock pin
27 Detector
27A Depressing plate
27B Switch device
27C Button
28 Refueling switch
29 Multifunction display
30 Fuel gas exhaust path
32 Relief valve
33 Pressure sensor
34 Leakage diagnostic device
35 Filter
36 Purge path
37 Purge valve
38 Intake path
39 Injector
41 Lock receiver
41A Shaft
41B Opening degree adjuster
41C Inclined surface
42 Rotating arm
42A Rotating shaft

The invention claimed is:

1. A vehicle fuel system comprising:
a fuel filler port through which fuel is to be supplied to a fuel tank of a vehicle;
a fuel filler space of a vehicle body of the vehicle, the fuel filler port being disposed in the fuel filler space;
a fuel filler flap configured to block an opening of the fuel filler space to be openable and closable;
a locking mechanism configured to regulate opening and closing operation of the fuel filler flap with respect to the opening; and
a detector configured to detect an open or closed state of the fuel filler flap,
wherein the locking mechanism includes:
a lock that is provided on the vehicle body and configured to operate in the fuel filler space; and
a lock receiver that is provided on the fuel filler flap on the fuel filler space side and configured to be locked by the lock,
wherein the detector detects at least:
a first detection value indicating that the lock receiver is locked by the lock and the fuel filler flap is in a full-closed state with respect to the opening; and
a second detection value indicating that the lock receiver is locked by the lock and the fuel filler flap is in a semi-open state with respect to the opening, and
wherein the semi-open state is a position in which the fuel filler flap is positioned away from the opening of the fuel filler space.

2. The vehicle fuel system according to claim 1, further comprising a controller configured to determine at least an operational state of the fuel filler flap and a stuck-closed state of the detector, based on an operation detection result of the lock inputted from the locking mechanism and the first detection value or the second detection value inputted from the detector.

3. The vehicle fuel system according to claim 2, wherein within one driving cycle from when an ignition of the vehicle is turned on until when the ignition of the vehicle is turned off, the lock operates at least once from a lock position that puts the fuel filler flap into the full-closed state to a lock position that puts the fuel filler flap into the semi-open state, at a timing other than a timing of supplying the fuel to the fuel tank.

4. The vehicle fuel system according to claim 1, wherein the detector detects the open or closed state of the fuel filler flap while the vehicle is traveling.

5. A vehicle fuel system comprising:
a fuel filler port through which fuel is to be supplied to a fuel tank of a vehicle;
a fuel filler space of a vehicle body of the vehicle, the fuel filler port being disposed in the fuel filler space;
a fuel filler flap configured to block an opening of the fuel filler space to be openable and closable;
a locking mechanism configured to regulate opening and closing operation of the fuel filler flap with respect to the opening; and
a detector configured to detect an open or closed state of the fuel filler flap,
wherein the locking mechanism includes:
a lock that is provided on the vehicle body and configured to operate in the fuel filler space; and
a lock receiver that is provided on the fuel filler flap on the fuel filler space side and configured to be locked by the lock,
wherein the detector detects at least:
a first detection value indicating that the lock receiver is locked by the lock and the fuel filler flap is in a full-closed state with respect to the opening; and
a second detection value indicating that the lock receiver is locked by the lock and the fuel filler flap is in a semi-open state with respect to the opening, and
wherein within one driving cycle from when an ignition of the vehicle is turned on until when the ignition of the vehicle is turned off, the lock operates at least once from a lock position that puts the fuel filler flap into the full-closed state to a lock position that puts the fuel filler flap into the semi-open state, at a timing other than a timing of supplying the fuel to the fuel tank.

6. A vehicle fuel system malfunction detection method for a vehicle fuel system including a controller configured to determine at least an operational state of a fuel filler flap and a stuck-closed state of a detector, the detector being configured to detect opening and closing operation of the fuel filler flap, the vehicle fuel system malfunction detection method comprising
determining, by the controller, at least the operational state of the fuel filler flap or the stuck-closed state of the detector, based on an operation detection result of a lock inputted from a locking mechanism and an opening and closing detection result of the fuel filler flap inputted from the detector, the locking mechanism including the lock configured to regulate the opening and closing operation of the fuel filler flap,
wherein, within one driving cycle from when an ignition of a vehicle is turned on until when the ignition of the vehicle is turned off, the controller determines the operational state of the fuel filler flap or the stuck-closed state of the detector at least once, at a timing other than during refueling work.

7. The vehicle fuel system malfunction detection method according to claim 6, wherein, in a case where the operation detection result indicating that the lock has operated is inputted from the locking mechanism and the opening and closing detection result indicating that the fuel filler flap has not opened is inputted from the detector, the controller determines that the fuel filler flap is in a malfunction state or that the detector is in the stuck-closed state.

8. The vehicle fuel system malfunction detection method according to claim 7, wherein, after determining that the fuel filler flap is in the malfunction state or that the detector is in the stuck-closed state, the controller returns the lock of the locking mechanism to an original position before operation.

9. A vehicle fuel system comprising:
a fuel filler port through which fuel is to be supplied to a fuel tank of a vehicle;
a fuel filler space of a vehicle body of the vehicle, the fuel filler port being disposed in the fuel filler space;
a fuel filler flap configured to block an opening of the fuel filler space to be openable and closable;
a locking mechanism configured to regulate opening and closing operation of the fuel filler flap with respect to the opening; and
a detector configured to detect an open or closed state of the fuel filler flap,
wherein the locking mechanism includes:
a lock that is provided on the vehicle body and configured to operate in the fuel filler space; and
a lock receiver that is provided on the fuel filler flap on the fuel filler space side and configured to be locked by the lock, wherein the detector detects at least:
   a first detection value indicating that the lock receiver is locked by the lock and the fuel filler flap is in a full-closed state with respect to the opening; and
a second detection value indicating that the lock receiver is locked by the lock and the fuel filler flap is in a semi-open state with respect to the opening, and
wherein the detector further detects a third detection value indicating the lock receiver is not locked by the lock and the fuel filler flap is in a full-open state of being fully open with respect to the opening.

* * * * *